Oct. 3, 1933.  A. W. IRBER  1,928,665
HEADLIGHT DEVICE
Filed Nov. 30, 1931
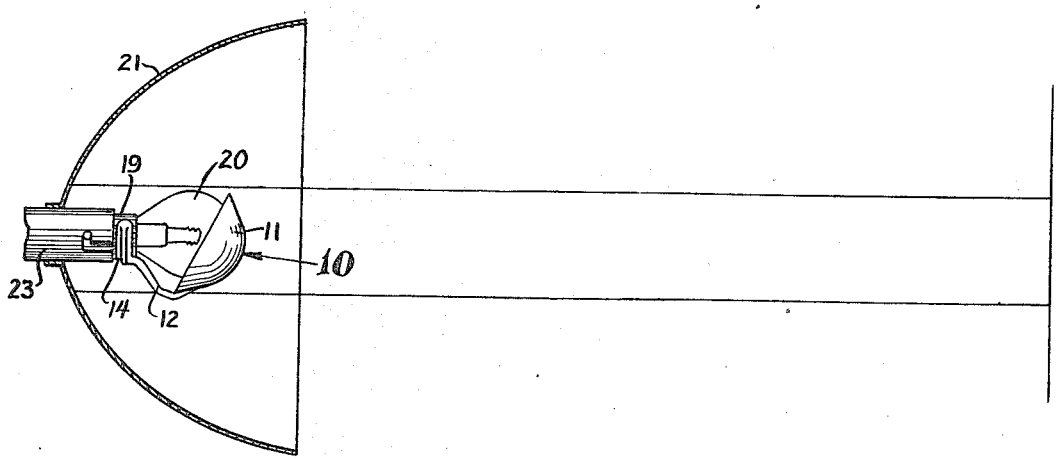
Fig. 1
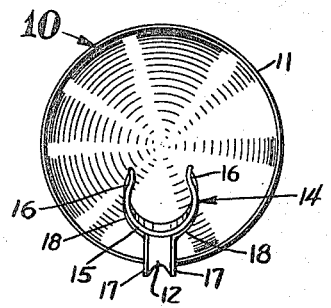
Fig. 4
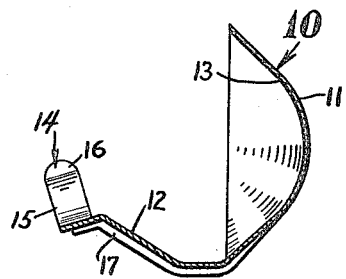
Fig. 3
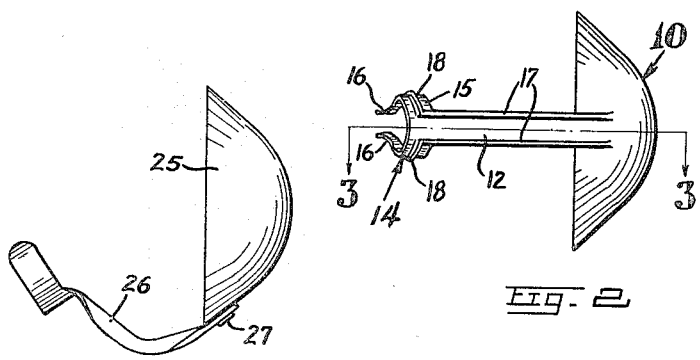
Fig. 5
Fig. 2
INVENTOR.
ARTHUR W. IRBER
BY B. J. Craig
ATTORNEY.

Patented Oct. 3, 1933

1,928,665

UNITED STATES PATENT OFFICE 1,928,665

HEADLIGHT DEVICE

Arthur W. Irber, Bell, Calif., assignor of one-half to Frank Tschurn, Bell, Calif.

Application November 30, 1931
Serial No. 577,954

1 Claim. (Cl. 240—48.6)

This invention relates to headlight devices which are particularly adapted for motor vehicles.

The general object of the invention is to provide an improved headlight device which, while eliminating glare will produce increased illumination of the roadway.

A further object of the invention is to provide a readily attachable and removable headlight device which is adapted to eliminate glare.

Another object of the invention is to provide an improved headlight reflector which is adapted to be removably secured in position on a headlight bulb to prevent glare and to properly concentrate the rays of light.

Other objects of the invention will be apparent from the following description taken in connection with the accompanying drawing, wherein:

Fig. 1 is a sectional view through a headlight showing my invention applied thereto.

Fig. 2 is a bottom plan view showing my invention.

Fig. 3 is a section taken on line 3—3, Fig. 2.

Fig. 4 is a rear view showing my invention.

Fig. 5 is a side elevation of a modification.

Much difficulty has been experienced in the use of automobile headlights due to the fact that when the lights are bright enough to produce satisfactory illumination they produce a glare which is exceedingly dangerous. Many efforts have been made to eliminate this glare and these efforts have included the use of various kinds of lenses, shields, reflectors, etc. My invention aims to overcome the difficulties and to provide a device which can be manufactured economically and which can be readily installed and which is not likely to get out of order.

As shown in the accompanying drawing my device which is indicated generally at 10 includes a reflector member 11 having an arm 12 projecting therefrom. The reflector 11 and the arm are preferably made of one piece of metal such as brass by stamping and the reflector is preferably parabolic in cross section. The interior 13 of the reflector is plated with chromium, nickel, or other reflecting material.

The arm 12 terminates in a clip 14 which includes a base 15 and a pair of spring arms 16, the purpose of which will be presently described. The arm 12 is arcuate in cross section as shown in Fig. 4 and is provided at each side thereof with a reinforcing flange 17 which is continued onto the base 15 of the clip where it merges into a bead 18 which extends along the arms 16.

In the use of my device the headlight lens is removed and the clip 14 is positioned adjacent the base 19 of the headlight lamp bulb. The spring arms 16 are then forced over the base 19 which they tightly grasp to hold the reflector 13 in front of the bulb 20. The reflector 11 has its axis directed rearwardly and upwardly and as a result strike the light rays which strike this reflector 11 are directed upwardly and rearwardly so that these rays in leaving the headlight reflector 21 are directed downwardly and as a result the light is spread out forwardly and downwardly in fan shape so that all glare is eliminated.

If desired the arm 16 may be of a size to engage the socket 23 instead of the base of the bulb, although I now prefer to secure the device by engagement with the bulb.

In Fig. 5 I have shown a slight modification wherein the reflector 25 is provided with an arm 26 which is made separate from the reflector and which is secured thereto by means of a rivet 27. In this modification the reinforcing bead on the clip is omitted as shown in the drawing.

From the foregoing description it will be apparent that I have invented a novel form of headlight device which is highly effective in use, which can be economically manufactured and which is not likely to get out of order.

Having thus described my invention, I claim:

A headlight device adapted to be secured to a headlight bulb, said device including a metallic clip having a single arm projecting therefrom, said arm being arcuate in transverse cross section and having a downwardly projecting integral reenforcing flange at each side thereof, said clip being resilient and including spaced members each having a bead thereon merging into said arm, said clip being adapted to engage a bulb base, a reflector on said arm, said reflector being parabolic in cross section and being integral with said arm and so arranged that the axis or the reflector is directed upwardly and rearwardly when in service position.

ARTHUR W. IRBER.